(12) United States Patent
Kang et al.

(10) Patent No.: US 7,569,245 B2
(45) Date of Patent: Aug. 4, 2009

(54) WASHED DEBONED MEAT HAVING HIGH PROTEIN RECOVERY

(75) Inventors: Iksoon Kang, Madison, WI (US); Gary Robert Skaar, Marshall, WI (US); William Nathaniel Gale Barron, III, Waunakee, WI (US); Cory Jay Painter, Madison, WI (US); James Donald Colby, Shakopee, MN (US); Henri K. Salman, Simpsonville, SC (US)

(73) Assignee: Kraft Foods Holdings, Inc., Northfield, IL (US)

( * ) Notice: Subject to any disclaimer, the term of this patent is extended or adjusted under 35 U.S.C. 154(b) by 888 days.

(21) Appl. No.: 10/855,028

(22) Filed: May 26, 2004

(65) Prior Publication Data

US 2005/0266145 A1 Dec. 1, 2005

(51) Int. Cl.
*A22C 17/08* (2006.01)

(52) U.S. Cl. .................. 426/646; 426/495; 426/518; 452/135; 210/773; 210/787; 210/806

(58) Field of Classification Search ......... 426/641–647, 426/443, 455, 464, 478, 495, 519, 805, 807, 426/518; 210/767, 773, 787, 806; 452/135–140; 99/537
See application file for complete search history.

(56) References Cited

U.S. PATENT DOCUMENTS

| | | | | |
|---|---|---|---|---|
| 3,112,203 A * | 11/1963 | Watt | ............................ | 426/59 |
| 3,594,190 A * | 7/1971 | Eslinger et al. | ............. | 426/646 |
| 3,891,780 A * | 6/1975 | Novak et al. | ................ | 426/657 |
| 4,193,869 A * | 3/1980 | Brucker et al. | ............... | 210/705 |
| RE32,060 E | 12/1985 | McFarland | | |
| 4,708,055 A * | 11/1987 | Matsumoto et al. | ........... | 99/484 |
| 5,507,954 A * | 4/1996 | Carrillo | ....................... | 210/703 |
| 5,650,187 A * | 7/1997 | Franklin et al. | ............. | 426/417 |
| 5,667,435 A | 9/1997 | Baughman et al. | | |
| 5,698,255 A * | 12/1997 | Roehrig et al. | ............... | 426/646 |
| 5,762,993 A * | 6/1998 | Gundlach et al. | ........... | 426/646 |
| 5,813,909 A | 9/1998 | Goldston | | |
| 6,001,398 A | 12/1999 | Noda et al. | | |
| 6,235,339 B1 * | 5/2001 | Harmon et al. | ............. | 426/646 |
| 6,451,975 B1 | 9/2002 | Hultin et al. | | |

OTHER PUBLICATIONS

Henri K. Salman, "Ageuous Processing Influences on Composition and Functionally of Mechanically Seperated Broiler Meat", A Disseration, Louisana State University, Dec. 1995.

Froning, et al. "Improving the Quality of Mechanically Deboned Fowl Meat by Centrifugation", Journal of Food Science; vol. 38 (1973).

(Continued)

*Primary Examiner*—Drew E Becker
(74) *Attorney, Agent, or Firm*—Cook Alex Ltd.

(57) ABSTRACT

Deboned meat is subjected to processing in a surimi-type procedure in order to substantially reduce the heme content and thus the color intensity of the deboned meat, with bone marrow components and fat also being removed. When desired, the washed meat is subjected to dewatering, such as by pressing, in order to provide a color and fat reduced deboned meat. Multiple-stage separation is practiced, and the protein yield of the washed meat is advantageously elevated.

24 Claims, 4 Drawing Sheets

OTHER PUBLICATIONS

Froning, "Symposium: Properties, Problems, and Utilization of Mechanically-Deboned Muscle Tissue Mechanically-Deboned Poultry Meat", Food Technology; Sep. 1976.

Dawson, et al. "Pilot-Plant Washing Procedure to Remove Fat and Color Components from Mechanically Deboned Chicken Meat", Marketing and Products, Depart. of Food Science; Feb. 1, 1998.

Yang, et al. "Changes in Myofibrillar Protein and Collagen Content of Mechanically Deboned Chicken Meat Due to Washing and Screening", Processing and Products, Depart. of Food Science and Technology; 1992.

Kijowski, "More Usable Meat From Surimi Technology", World Poultry-Misset Vol. 11; No. 9, 1995.

Frontier Technology, Inc., "How the Wedge Presses Work", copy received Dec. 24, 2002.

Midwestern Industries, Inc., "Vibratory screeners, wire cloth, and mesh replacement", Midwestern Industries, Inc., 1998.

Parkson Corporation, "Processes", Parkson Corporation; copy received Mar. 23, 2004.

Lyco Manufacturing, Inc., "A New Spin On Separating Waste Solids", copy received by Jan. 2003.

* cited by examiner

WASHED DEBONED MEAT HAVING HIGH PROTEIN RECOVERY

BACKGROUND OF THE INVENTION

1. Field of the Invention

This invention generally relates to improving deboned meat sources. These deboned meat sources are washed and filtered to remove undesirable attributes. More particularly, the invention relates to enhancing deboned meat while enhancing protein yield and minimizing protein waste. The washed deboned meat is suitable for use as a light-colored meat source for a variety of food products.

2. Description of Related Art

In meat processing plants, efforts are made to recover as much meat product as possible. One aspect of meat conservation in this regard is by practicing so-called deboning procedures. Deboning equipment is well-known in the art. Suitable equipment is available from Beehive, Inc. Illustrative of this technology are the processes and equipment that are shown in Beehive U.S. Pat. No. Re. 32,060, U.S. Pat. Nos. 5,667,435, and 5,813,909. Each of these patents is incorporated by reference hereinto. In essence, deboning equipment and processes operate on bones and slaughterhouse by product which is typically left after whole muscle cuts and cuts for ground meat are removed from animal carcasses during meat processing operations.

Deboning recovers edible flesh from sources which also include components that are generally considered inedible. These inedible types of components typically are relatively hard or tough and include bone, tendons, gristle and the like. In an overall sense, deboning equipment and processes separate the edible components from these typical inedible components. While deboning equipment and processes typically do an excellent job of this type of separation, the resulting edible components often are not suitable for use in many applications without further processing. While the edible product is substantially free of bones, it tends to include residue bone fragments, tendons and gristle and to be relatively high in fat and dark in color.

It has come to be appreciated that a so-called "surimi" process can be useful in washing protein sources with a view toward improving edible products. A conventional surimi process has traditionally been used in conjunction with fish products. Less common is the use of a surimi-like process in processing low quality meat sources. Examples in this regard include U.S. Pat. No. 6,451,975, incorporated by reference hereinto. This particular patent takes the approach of processing fish or meat by mixing particulate animal muscle tissue with an acidic aqueous solution in order to solubilize muscle proteins and then precipitating and recovering animal muscle proteins. This approach has the disadvantage of subjecting the meat protein to harsh acidic conditions.

Another surimi type of process is found in U.S. Pat. No. 6,001,398, incorporated by reference hereinto. By this approach, fish or animal meat is combined with a short-chain alcohol and an alkaline substance, followed by grinding under vacuum. This approach adds substantial quantities of alcohols and other materials which can substantially change the character of the meat and/or require additional processing.

Approaches have been suggested for aqueous washing of deboned poultry meat. Examples, include Shahidi et al., "Effects of Aqueous Washings On Colour and Nutrient Quality of Mechanically Deboned Chicken Meat," *Meat Science*, 32, pages 289-297, (1992), and Yang et al., "Changes in Myofibrillar Protein and Collagen Content of Mechanically Deboned Chicken Meat Due to Washing and Screening," *Poultry Science*, 71, pages 1221-1227, (1992). Art of this type describe surimi-like aqueous washing being applied to mechanically deboned poultry meat. These publications, which are incorporated by reference hereinto, wash the deboned meat with a solution of 0.5 percent sodium chloride or sodium bicarbonate. Screen sieving follows, and hemoprotien pigments and fat are removed, thereby upgrading the deboned poultry meat. With these types of processes, substantial quantities of protein are lost. Filtering proposals have been made, but these are not suitable for large-scale commercial meat processing operations. An example of the latter is the use of cheesecloth, which is not a suitable alternative in large scale operations where high flow through rates and economies of scale are essential.

Another approach which is suggested in smaller scale operations is noted in Froning, "Mechanically-Deboned Poultry Meat", *Food Technology*, September 1976, pages 50-63, and Dawson et al., "Pilot-Plant Washing Procedure to Remove Fat and Color Components from Mechanically Deboned Chicken Meat," *Poultry Science*, 68, pages 749-753, 1989, each incorporated by reference hereinto. References such as these discuss subjecting mechanically deboned poultry meat to centrifuge procedures in an effort to upgrade the meat salvaged by deboning operations. Yields of protein from the deboned sources are lower than desired for efficient commercial operations.

Publications such as these illustrate conventional methods of liquid-solid separation that report yields which suggest that substantial protein is lost during such processes. For example, the Dawson et al. article reports protein yield of the washed mechanically deboned chicken meat from its decanting centrifuge of 15.8 percent when compared to the unwashed mechanically deboned chicken meat. Yang et al., which discloses capturing protein on a single screen having 0.85 mm openings after washing, reports a yield of 23 percent of the unwashed mechanically deboned chicken meat. Kijowski, "More Useable Meat from Surimi Technology," *World Poultry*, 11:37, 1995, reports a 35 percent yield from mechanically deboned poultry meat under unspecified optimal conditions. Shahidi et al. indicates a protein recovery of up to 56.5 percent from layers of cheesecloth, unlikely to be practically applicable to a continuous process on a large scale of the type needed for a successful commercial process.

Heretofore, deboned meat has not been subjected to surimi-type washing procedures which upgrade the deboned meat source without also experiencing substantial losses of protein present in that source. The result of the invention is high protein recovery of upgraded deboned meat. The upgrading subjects the deboned meat to washing in order to remove quantities of coloration and heme pigments that often will detract from possible uses of deboned meat in more premium meat products. In addition, a substantial proportion of fat is removed from the deboned meat in order to provide leaner sources of relatively inexpensive meat supplies. This is achieved while addressing an especially difficult problem for processing deboned meat. The processing must be efficient and available for continuous processing at advantageous flow rates without adding costs at a prohibitive level, keeping in mind there is little room for additional costs in processing such low level meat sources as deboned meat.

SUMMARY OF THE INVENTION

In accordance with the present invention, deboned meat is slurried and subjected to liquid-solid separation action which is carried out in multiple stages with separation interfaces of different respective porosities that decrease in pore size in the downstream direction. A deboned meat which is lighter in color and lower in fat content than the initial deboned meat is thus provided. The resulting enhanced deboned meat retains a high percentage of protein present in the initial deboned meat. In an alternate embodiment, the enhanced deboned meat is dewatered, such as by pressing, in order to provide a deboned product having a desired water content which is lower than that of the enhanced deboned meat. Preferably, this embodiment includes recycling a press residue component into the liquid-solid separation equipment whereby protein which made its way into the press residue during the pressing operation is subjected to liquid-solid separation in order to recover protein therefrom and enhance the yield of protein present in the dewatered deboned meat.

A general aspect or object of the present invention is to provide deboned meat which exhibits reduced coloration and/or odor and reduced fat while having an enhanced protein yield.

Another aspect or object of the present invention is that it provides a method for enhancing protein yield while preparing a surimi-type of deboned meat which can be dewatered in order to provide a deboned meat having a desired water content.

Another aspect or object of this invention is that it provides deboned meat which is upgraded in quality and appearance so as to be suitable for applications of higher value than typical deboned meat.

Another aspect or object of the present invention is that it is able to transform a poultry meat byproduct into meat material having improved composition, appearance and value for use in restructured poultry-based or poultry-including food products.

Another aspect or object of this invention is that it provides a washed deboned meat having in excess of half of the protein of the meat from the deboner present in the enhanced deboned meat, including dewatered enhanced deboned meat.

Another aspect or object of the invention is that it provides a deboned meat source which has a protein percentage and/or water percentage approximately equal to that of pretreated deboned meat and which also has about one half of the fat thereof.

Other aspects, objects and advantages of the present invention will be understood from the following description according to the preferred embodiments of the present invention, specifically including stated and unstated combinations of the various features which are described herein, relevant information concerning which is shown in the accompanying drawings.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The present invention is directed toward deboned meat products. These meat products can originate from any animal source, including poultry, bovine, porcine and mutton sources. The invention is especially suitable for poultry meat, and poultry is the preferred deboned meat starting material for the present invention. Poultry includes chicken, turkey, duck, goose, game fowl or other poultry sources. The invention finds special application when the originating deboned meat is turkey or chicken.

Figure 2:
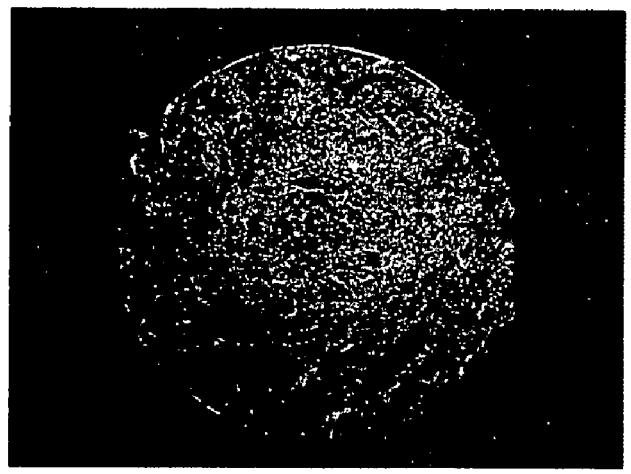
FIG. 2 is a photomicrograph of deboned ground turkey drumstick meat prior to being subjected to any type of washing technique.
Figure 3:
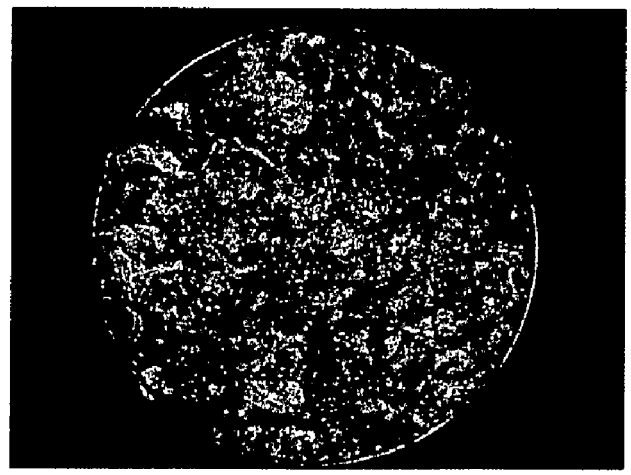
FIG. 3 is a photomicrograph of deboned ground turkey drum meat after being made into a slurry and subjected to a single liquid-solid separation through two separation screens or interfaces having 475/200 mm porosity.
Figure 4:
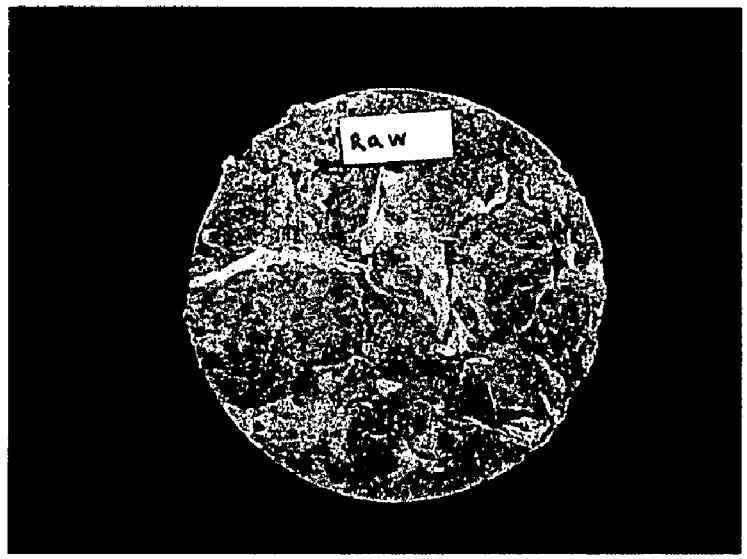
FIG. 4 is a photomicrograph of deboned ground turkey wing meat prior to being subjected to any type of washing technique.
Figure 5:
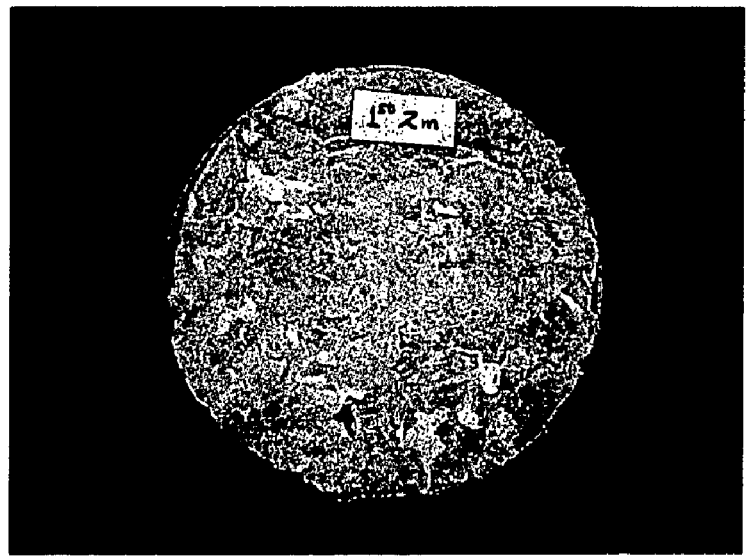
FIG. 5 is a photomicrograph of deboned ground turkey wing meat after having been slurried and subjected to a single stage liquid-solid separation through two separation screens or interfaces having 475/200 mm porosity.
Figure 6:
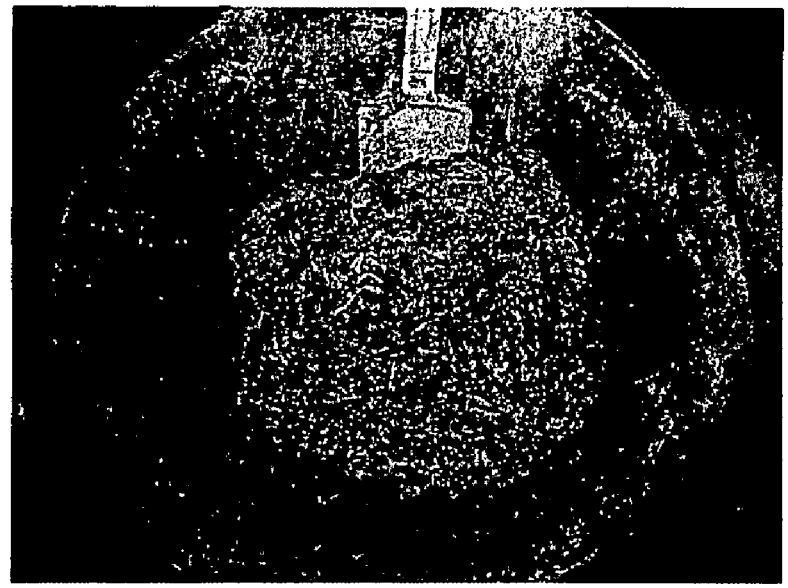
FIG. 6 is a photomicrograph of deboned ground turkey wing meat which was slurried and subjected to liquid-solid separation through a separation interface having a porosity of 125 mm.
Figure 7:
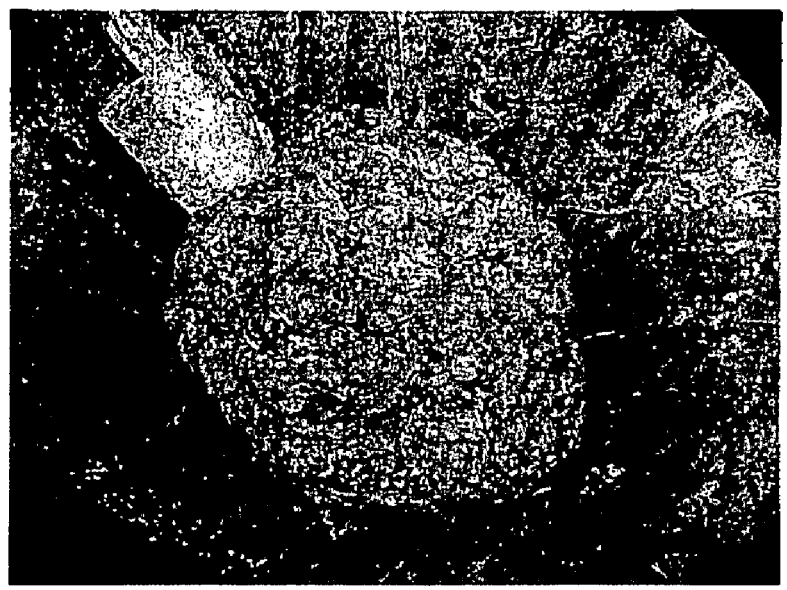
FIG. 7 is a photomicrograph of deboned ground turkey wing meat which was slurried and subjected to double liquid-solid separation events, through a separation interface having a porosity of 125 mm.

In many applications, the deboned meat is advantageously provided as ground meat. Accordingly, in a preferred embodiment, the deboned meat is subjected to conventional grinding procedures with equipment known to those of ordinary skill in the art. Deboned turkey meat, typically ground but not necessarily ground, prior to processing according to the present invention is referred to herein as deboned meat, indicating deboned meat as same initially enters the processing according to the invention. Ground deboned turkey meat is shown in FIG. 2 and FIG. 4. It will be appreciated that this deboned meat is not cooked, but instead is so-called raw meat. Typically, the deboned meat is at a pH of about 6.5.

When proceeding according to the invention, the deboned meat is slurried, separated and preferably also pressed to adjust moisture content. Concerning the slurry preparation, this can be carried out within a mixer or plurality of mixers 11, illustrated in FIG. 1. During the slurry preparation, the deboned meat is combined with water, and a slurry is prepared. Preferably, this slurry includes not more than about one weight percent of sodium chloride and/or sodium bicarbonate or other salt suitable for use within commercial meat processing operations. Typically, the amount of the salt is between about 0.3 weight percent and about 1 weight percent. In order to form a suitable slurry, the ratio of meat to water is between about 1:4 and about 1:8. A preferred ratio for a meat such as turkey is 1:6 of meat to water.

In order to help maintain the freshness and quality of the raw deboned meat, the slurry is maintained at a temperature of between about 2° C. and about 5° C. Typically, the slurry formation within the mixing unit will proceed for about one-quarter of an hour to about one-half of an hour, or until the meat is adequately slurried so that optimum separation will later be facilitated.

In accordance with the invention, the deboned meat slurry then is subjected to multi-stage liquid-solid separation. On a functional level, the separation takes place within equipment which provides a plurality of interfaces each having an area or surface or location having openings of a given size. These openings provide a porosity of a given amount. Particles or liquids within the slurry which have a size smaller than the porosity of the particular separation interface pass therethrough. This is the filtrate at a given separation stage. Particles which are larger than the porosity or opening size of the particular separation interface do not pass therethrough. This is the retentate at a given separation stage.

In proceeding with the multi-stage separation, the filtrate from an upstream separation interface is passed to another separation interface downstream thereof which has a porosity that is smaller than that of the upstream separation interface. That is, the openings of an initial or an upstream separation location are larger than those of a downstream, or a secondary or a subsequent separation location. In an embodiment of the invention, another separation interface can be provided. This can be an initial phase or a tertiary or a finishing phase for separation. In the instance where this is a finishing phase, the finishing separation interface has a porosity finer than any preceding separation interface.

It will be appreciated that the number of separation interfaces can be varied as desired, provided there are at least two such interfaces. For many applications, providing three separation interfaces of increasing fineness or decreasing pore size is especially suitable. For others, four or more separation interfaces or phases are advantageous.

In most applications and when only two separator interface locations are utilized, the porosity of the initial separator surface is between about 200 and about 1000 microns, while the downstream separation interface is in the nature of a finishing porosity for this type of product, which is between about 100 and about 200 microns.

In a three-stage separation approach, the additional separation interface typically will be the initial interface, and it provides the largest porosity separation interface. This porosity is at least about 1000 microns. The porosity can be as large as about 50,000 microns (or 50 mm). It will be appreciated that all of the porosity values are somewhat dependant upon the consistency and contents of the deboned meat slurry. In some applications, the initial phase separation interface porosity can be as large as between about 20 and about 50 mm, or between 20,000 and 50,000 microns.

Whatever the number of multiple separation interfaces, the retentate from each is removed for collection as a component of the washed or surimi-type meat. Typically, these retentates are combined and/or collected together to provide the product according to the invention, prior to any dewatering.

The filtrate passing out of an upstream separation interface becomes the feed into a downstream separator interface. Preferably, each downstream separation interface has a porosity which is smaller or narrower than the separator interface or interfaces upstream thereof. Thus, in the preferred arrangement, each filtrate that had passed out of each separator interface next encounters a separator interface having a smaller, or narrower porosity. In this way, some particles that passed through an upstream location will become retentate components at a downstream location.

Equipment which can provide this multi-stage pressing must be able to provide this varying porosity. Equipment for this type of operation is exemplified by the following machinery. One liquid-solid separator is identified as a Double-Drum screen separator of Lyco Manufacturing, Inc. This consists of an inner rotating drum for collecting larger particulates, which are separated through the use of a stainless steel screen. An outer rotating drum has a finer screen in order to separate the finer particulates from the filtrate of the inner rotating drum. A third screen also can be provided. Another piece of equipment of this general type is a Rotostrainer liquid-solid separator available from Hycor. This uses a technology whereby a rotating drum moves material through a screen interface which has a curvature to accommodate the drum.

Other screening equipment includes vibration or shaker screening separation equipment. Examples include ME and MR Series Round Gyra-Vib separators available from Midwestern Industries, Inc. With this type of equipment, generally flat screens are vibrated in order to facilitate separation of retentate and filtrate.

Separation equipment such as that generally described above can be used in combinations as desired in order to achieve a multi-stage separation function. For example, multiple units might be needed in order to carry out a three-stage or higher stage separation and can combine pressure action and vibratory action.

Figure 1:
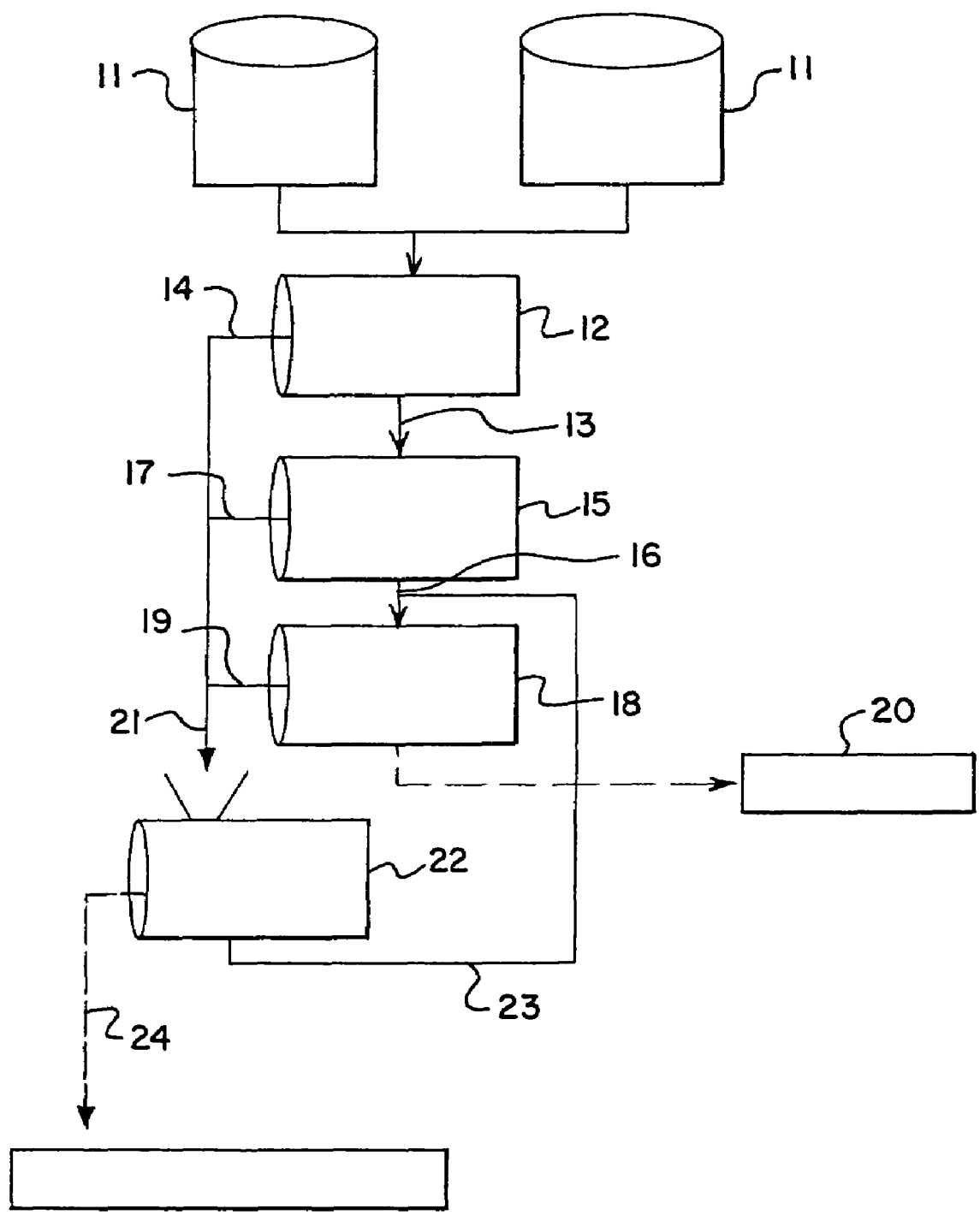
FIG. 1 is a schematic illustration of a preferred system according to the invention.

The schematic illustration in FIG. 1 shows an initial or upstream separation interface 12 which receives the slurry from mixer 11. This provides the coarsest interface porosity. Filtrate passes therethrough, as represented at 13. Retentate flows, at 14, from the location of the separator interface 12. From location 13, the filtrate passes to a downstream, or an intermediate separation interface 15. Filtrate passing therethrough is shown at 16, while retentate therefrom is shown at 17. A downstream or finishing tertiary separator interface 18 is shown in FIG. 1. In this illustration, the filtrate passes to a waste location 20, while its retentate proceeds as at 19.

When the resulting surimi-type meat product has the water content which is desired for the particular application, the retentates are combined to provide a washed deboned meat product illustrated at 21. This product is found to have an especially high protein content as well as advantageously reduced color and reduced fat content.

In those instances where deboned meat product at 21 has excessive water for the particular deboned meat application, this deboned meat is subjected to dewatering. Preferably, dewatering is carried out in pressing equipment 22. This equipment removes liquid which moves into a conduit, space or passageway 23. In a typical approach, the dewatering unit is used to at least eliminate free-flowing water.

In an aspect of this embodiment of the invention, this liquid is fed into a separation interface and is thus recycled in order to remove residual meat protein therefrom. Typically, this will be accomplished through the finest of the separation interfaces which are provided in this equipment. In FIG. 1, this is finishing separation interface 18. With this action, further meat protein retentate is captured by the separation interface 18 then moves to location 19, and this then flows to the dewatering equipment to complete the recycle path.

Once dewatering has been completed, the solids material from the presser is collected as washed surimi-type meat that has been dewatered to meet deboned meat moisture specifications for a particular application. Even with this pressing operation, the washed and dewatered meat has enhanced protein yield characteristics.

With reference to the meat product according to the invention, the initially provided deboned meat shows very significant improvement in color, which is an objective of a surimi-type of process. Texture and flavor also are improved. With the present invention, there is a distinct advantage in minimizing loss of protein during the surimi-type operation. Utilization of prior washing processes in the red meat industry has not had significant implementation due primarily to poor protein yield after washing and liquid separation.

Protein yields after passage through the separation interfaces according to the invention are at least 60 percent by weight of the protein found in the deboned meat prior to processing according to the invention. Typically, these yields will be at least about 65 weight percent, often at least about 70 weight percent. In a particularly advantageous aspect of the invention, this protein yield at this stage is at least 72 weight percent and up to 75 weight percent and above. In addition, the fat content of a typical deboned meat is reduced by approximately one half by the processing according to the invention.

Concerning dewatering and protein yield, some additional protein typically will be lost during the dewatering operation if carried out under the invention. Protein yield is maximized by the recycling operation exemplified herein. The amount of protein loss during dewatering will depend somewhat upon the moisture reduction that is required to provide the desired final dewatered product.

A typical washed and dewatered product according to the invention will have a protein yield of at least about 50 weight percent of the protein present in the initial deboned meat. Usually this protein recovery is at least about 55 weight percent, and preferably at least about 60 weight percent. In a more specific example, when the washed deboned meat has a protein yield of 72 to 75 weight percent of the initial deboned meat, the yield after dewatering is about 65 to 66 weight percent when the moisture content of the washed meat at 84 to 85 percent is reduced to 77 to 79 percent.

The products according to this invention show a higher quality profile for up to six days after processing when compared with the unprocessed, initially provided deboned meat. This higher quality profile includes less serum odor, lighter color, and reduced rancidity. The substantial reduction or elimination of serum heme pigments and bone marrow components during the washing is believed to contribute to the improved odor and color and reduced rancidity.

As examples of typical properties of products according to the invention, deboned turkey drumstick meat usually has a protein content of about 17 to 18 weight percent, a fat content of about 10 to 12 weight percent, and a moisture content of about 68 to 71 weight percent. After being subjected to the multiple separation innerface procedures according to the invention, the protein content is between about 10.5 and 11.5 weight percent, which is a protein yield of about 72 to 75 percent. The fat content is reduced significantly, to only about 3 to 4 weight percent. A typical washed product has a relatively high moisture content, of approximately 84 to 85 weight percent, while the total weight of the relatively high water content meat is 110 to 120 pounds.

After proceeding with a dewatering procedure in accordance with an embodiment of the invention, the washed and pressed deboned meat is at a protein level of between about 16.3 and 17.2 weight percent. This equates to a protein yield of about 65 to 66 percent. The fat content percentage, even after reducing the moisture level, is still at half of the original fat content percentage, namely at about 5 to 6 weight percent. The moisture content of the dewatered meat product in this example is about 77 to 79 weight percent, with the total weight of the washed and dewatered meat being 65 to 72 pounds.

As an illustration of the reduction of heme which is achieved according to the invention, a typical deboned turkey drum meat has a heme content of about 173 ppm. After proceeding with the slurry formation, liquid-solid separation and dewatering, the enhanced deboned turkey meat has a typical heme content of only about 31 ppm. The heme analysis is carried out by extracting meat pigments from the meat sample with an acetone/water/hydrochloric acid mixture. The optical density of the filtrate then is noted at 640 nm. The concentration of pigments is calculated according to Hornsey's theory (Hornsey, *Journal of Science Food Agriculture*, Vol. 7, page 534, 1956.) This procedure extracts all heme pigments, cured and uncured, and does not distinguish between types of pigments. Results are expressed as ppm of total heme.

Color values as measured by a Minolta Colorimeter showed significantly improved color characteristics, primarily as reduced redness and/or darkness. The values for the deboned meat prior to processing according to the invention are an L* value of 55.1, an a* value of 17 and a b* value of 8.1. After processing including dewatering, the L* value was 63.1, the a* value was 7.7, and the b* value was 12.7. Each change in value indicates, in effect, greater lightness. More particularly, a higher L* value indicates greater lightness, a higher a* value indicates greater redness, and a higher b* value indicates greater yellowness of the meat processed according to the invention.

The reduction in "overall aroma" is determined by a sniff test having a scale of 1 to 7, with 1 indicating no odor and 7 indicating a strong odor to a trained panel. The initial, unprocessed deboned meat gave an overall aroma value of 1.86 at Day 1, of 1.9 at Day 2, of 1.85 at Day 3, of 2.6 at Day 4, of 3.0 at Day 6, and of 2.8 at Day 7. These are the number of days stored at 4° C. For the deboned meat that was then washed and subjected to multi-stage liquid-solid separation, the Day 1 value was 1.23, the Day 2 value was 1.43, the Day 3 value was 1.61, the Day 4 value was 1.95, the Day 6 value was 2.47, and the Day 7 value was 3.16.

A sniff test illustrates reduced "rancidity odor" through 6 days of storage at 4° C. The testing was done by a trained panel, with a value of 1 indicating no rancidity odor, while a value of 7 indicated a strong rancidity odor. For the unwashed and unprocessed deboned turkey and drumstick meat, the rancidity value at Day 1 was 1.27, at Day 2 was 1.25, at Day 3 was 1.3, at Day 4 was 1.73, at Day 6 was 2.08, and at Day 7 was 2.26. When this meat was slurried and subjected to multi-stage liquid-solid separation, the resulting washed deboned meat had a rancidity odor value of 1.08 at Day 1, of 1.19 at Day 2, of 1.18 at Day 3, of 1.49 at Day 4, of 1.75 at Day 6, and of 2.35 at Day 7.

Examples are now provided in order to illustrate the concepts of the invention with a certain degree of specificity.

EXAMPLE 1

Deboned turkey drumstick meat from a Beehive deboner was subjected to multi-stage washing. 100 pounds of the deboned meat was mixed with 600 pounds of a 0.5% sodium chloride solution. Mixing proceeded for 15 minutes in a propeller type mixer. This was analyzed to have 17.5% protein, 13.3% fat and 68.6% moisture. The resulting slurry was subjected to multiple-stage liquid-solid separation using a Double Drum separator of Lyco Manufacturing, Inc. The inner screen of the separator had a porosity of 1400 microns, an outer screen had a porosity of 250 microns, and a third, residual separator screen had a porosity of 150 microns.

After passage through the 3-stage liquid-solid separator, the washed deboned meat was analyzed to have 7.6% protein, 6.9% fat and 85.4% moisture. This represented a percentage of total protein present in the processed meat of 72%, namely 12.6 pounds of protein when compared with 17.5 pounds of protein in the 100 pounds of meat prior to processing.

EXAMPLE 2

A triple-screen Rotostrainer liquid-solid separator was used to separate a slurry of 100 pounds of deboned turkey drumstick meat with 600 pounds of a 0.5 weight percent sodium chloride solution. The meat, prior to slurry formation, had 17.3% protein, 12.45% fat and 69.3% moisture. After processing through the liquid-solid separator, the resulting washed deboned meat was analyzed to have a protein content of 8.6%, a fat content of 1.92%, and a moisture content of 89%.

The amount of protein in the original 100 pounds of meat was 17.24 pounds, while after washing, the amount was 10.787 pounds. This amounted to a percentage of total protein yield of 63 weight percent. This liquid-solid separator had an initial screen with a porosity of 1,000 microns, an intermediate, downstream screen having a porosity of 250 microns, and a downstream, finishing screen having a porosity of 150 microns.

EXAMPLE 3

The liquid-solid separator of Example 2 was used to separate a slurry of 250 pounds of deboned turkey meat containing heme and bone marrow components picked up during the deboning processing. A slurry was formed with 1,250 pounds of 0.5% sodium chloride solution. Mixing proceeded for 25 minutes in a propeller type mixer.

The deboned meat was analyzed to have a protein content of 17.2%, a fat content of 12.7%, and a moisture content of 69.4%. After the 3-stage liquid solid separation, the resulting washed meat product had a protein content of 7.3%, a fat content of 1.47%, and a moisture level of 90%. The percentage of total protein yield was calculated at 67%, with 28.21 pounds of protein in the washed product compared with 43 pounds of protein in the deboned meat.

EXAMPLE 4

50 pounds of turkey drumstick meat from a Beehive deboner is mixed with 300 pounds of a 0.5% sodium chloride solution for 15 minutes. Prior to slurring, the deboned meat was analyzed to have a protein content of 17.8%, a fat content of 11.4%, and a moisture content of 70.5%.

A Wedge Press liquid-solid separator from Frontier Technology, Inc. was provided with an initial, coarse screen having a porosity of 1,000 microns, together with a downstream, intermediate screen having a porosity of 250 microns, and a finishing screen having a porosity of 125 microns. The meat slurry was subjected to this 3-stage separation, and this washed and screened meat was analyzed to have a protein content of 10.9%, a fat content of 3.61%, and a moisture content of 85.2%.

For this product, it was determined that the moisture content was higher than desired, and the screened meat was passed through a wedge presser at 60 psi. The meat recovered from the press was analyzed to have a protein content of 17.1%, a fat content of 5.54%, and a moisture content of 77.3%. It will be appreciated that this results in a finished product having a protein and moisture content on the order of the original deboned meat, but with a substantially reduced fat content, as well as a lighter color.

Of the 8.9 pounds of protein in the original deboned meat, 6.5 pound were recovered after the multi-stage screening, representing a protein yield at this stage of 73 weight percent. After pressing and dewatering, the protein yield was 65% in that the amount of protein in the final product was 5.8 pounds.

EXAMPLE 5

A slurry was prepared from 50 pounds of turkey drumstick meat from a Beehive deboner. The slurry included 300 pounds of a 0.5% sodium chloride solution. Mixing proceeded for 15 minutes.

This slurry was treated with a shaker separator, followed by a wedge press dewatering procedure. The shaker separator had two screens. The upstream screen had a porosity of 250 microns, and the downstream screen had a porosity of 125 microns. The subsequent wedge presser was run at a pressure of 60 psi.

The original deboned meat was analyzed to have a protein content of 17.8%, a fat content of 10.73%, and a moisture content of 70.7%. After the two-stage screening, the meat had a protein content of 11.3%, a fat content of 3.52%, and a moisture content of 85.2%. After pressing, the meat was analyzed to have a protein content of 16.4%, a fat content of 5.19% and a moisture content of 78.1%. Protein yield after the shaker screen processing was 74.7 weight percent, with 6.64 pounds of protein being recovered of the 8.9 pounds in the original deboned meat. Protein yield after passage through the press was 65.6%, calculated from the 5.84 pounds of protein in the washed and pressed meat.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A process for enhancing protein yield content of washed deboned meat, comprising:
    mixing deboned meat with water so as to prepare a meat slurry;
    passing said meat slurry through openings of a separation interface having a first porosity between about 1000 and about 1400 microns thereby separating said meat slurry into a washed first meat retentate and a first filtrate;
    passing said first filtrate through openings of a separation interface having a second porosity between about 200 and about 1000 microns thereby separating said first filtrate into a washed second meat retentate and a second filtrate, said second porosity being less than said first porosity;
    passing said second filtrate through openings of a separation interface having a third porosity thereby separating said second filtrate into a third meat retentate and a third filtrate, said third porosity being less than said second porosity; and
    transporting each of said first, second and third meat retentates through a presser whereupon said meat retentates are pressed to provide a washed and dewatered deboned meat that is suitable for human consumption and has a protein content of at least about 50 weight percent of the deboned meat protein content.

2. The process in accordance with claim 1, wherein said washed and dewatered deboned meat has a protein content of at least about 60 weight percent of the deboned meat protein content.

3. The process in accordance with claim 1, wherein said first, second and third retentates have a combined protein content of at least about 60 weight percent of the deboned meat protein content.

4. The process in accordance with claim 1, wherein said washed and dewatered deboned meat product has a protein content which is approximately equal to that of the deboned meat prior to preparing the meat slurry.

5. The process in accordance with claim 1, wherein the protein content of the washed and dewatered deboned meat is within about 2 weight percentage points of the protein content of the deboned meat.

6. The process in accordance with claim 5, wherein the water content of the washed and dewatered deboned meat is within about 11 percentage points of the water content of the deboned meat, and the fat content is not greater than approximately half of the fat content of the deboned meat.

7. The process in accordance with claim 1, wherein said washed and dewatered deboned meat has a heme content which is reduced from that of the deboned meat whereby the washed deboned meat is of a lightened color.

8. The process in accordance with claim 1, wherein said deboned meat is prepared from poultry, bovine, porcine or mutton meat sources and combinations thereof.

9. The process in accordance with claim 1, further including grinding deboned meat prior to said mixing to prepare the meat slurry.

10. The process in accordance with claim 1, wherein the mixing includes combining the deboned meat and water at a ratio of between 1:4 and about 1:8.

11. The process in accordance with claim 1, wherein the mixing includes incorporating a salt to provide a water solution of between about 0.3 and about 1 weight percent salt.

12. The process in accordance with claim 1, wherein said slurry is maintained at a temperature between about 2° C. and about 5° C.

13. A process for enhancing protein yield content of washed deboned meat, comprising:
mixing deboned meat with water so as to prepare a meat slurry;
passing said meat slurry through openings of a separation interface having a first porosity between about 200 and about 1000 microns thereby separating said meat slurry into a washed first meat retentate and a first filtrate;
passing said first filtrate through openings of a separation interface having a second porosity between about 100 and about 200 microns thereby separating said first filtrate into a washed second meat retentate and a second filtrate, said second porosity being less than said first porosity;
transporting said first meat retentate and said second meat retentate to a presser whereat said meat retentates are pressed to provide a washed and dewatered deboned meat product and a presser residue component;
flowing said presser residue component through said separation interface having the second porosity thereby recovering a washed third meat retentate; and
transporting said third meat retentate to a presser whereat liquid is removed from said third meat retentate to provide a further quantity of washed and dewatered deboned meat that is suitable for human consumption and has a protein content of at least about 60 percent of the deboned meat protein content.

14. The process in accordance with claim 13, wherein said slurry is maintained at a temperature between about 2° C. and about 5° C.

15. A process for enhancing protein yield content of washed deboned meat, comprising:
mixing deboned meat with water so as to prepare a meat slurry, said deboned meat having a known protein content;
passing said meat slurry through openings of a separation interface having a first porosity between about 200 and about 1000 microns thereby separating said meat slurry into a washed first meat retentate and a first filtrate;
passing said first filtrate through openings of a separation interface having a second porosity thereby separating said first filtrate into a second meat retentate and a second filtrate, said second porosity being less than said first porosity, and said second meat retentate having a protein content which is at least about 60 weight percent of said known protein content of the deboned meat; and
transporting said first meat retentate and said second meat retentate to a presser whereupon said meat retentates are pressed to provide a washed and dewatered deboned meat product suitable for human consumption and a press residue component.

16. The process in accordance with claim 15, wherein the protein content of the washed and dewatered deboned meat is within about 2 weight percentage points of the protein content of the deboned meat.

17. The process in accordance with claim 15, further including flowing said press residue component through said separation interface having the second porosity thereby recovering a third meat retentate as further washed and dewatered deboned meat product.

18. A process for washing deboned meat while enhancing protein yield content thereof comprising:
mixing deboned meat with water so as to prepare a meat slurry, said deboned meat having a known protein content;
serially passing said meat slurry through openings of a separation interface having a first porosity between about 200 and about 1000 microns and through openings of a separation interface having a second porosity between about 100 and about 200 microns thereby separating said meat slurry into filtrate and a plurality of washed meat retentates which combine to provide a meat component having a protein content which is at least about 60 weight percent of said known protein content of the deboned meat, said second porosity being less than said first porosity; and
transporting said washed meat retentates to a presser whereat said meat retentates are pressed to provide a washed and dewatered deboned meat product and a press residue component, and said washed and dewatered deboned meat product has a protein content which is at least about 55 weight percent of said known protein content and that is suitable for human consumption.

19. The process in accordance with claim 18, further including flowing said press residue component through said separation interface having the second porosity thereby recovering a third meat retentate as further washed and dewatered deboned meat product.

20. The process in accordance with claim 19, wherein the protein content of the washed and dewatered deboned meat is within about 2 weight percentage points of the protein content of the deboned meat.

21. The process in accordance with claim 18, further comprising removing coloration from deboned meat while enhancing the yield of protein present in the deboned meat.

22. A process for enhancing protein yield content of washed deboned meat, comprising:

mixing deboned meat with water so as to prepare a meat slurry;

passing said meat slurry through openings of a separation interface having a first porosity between about 1000 and about 1400 microns thereby separating said meat slurry into a washed first meat retentate and a first filtrate;

passing said first filtrate through openings of a separation interface having a second porosity between about 200 and about 1000 microns thereby separating said first filtrate into a washed second meat retentate and a second filtrate, said second porosity being less than said first porosity;

passing said second filtrate through openings of a separation interface having a third porosity between about 100 and about 200 microns thereby separating said second filtrate into a washed third meat retentate and a third filtrate, said third porosity being less than said second porosity; and collecting each of said first, second and third meat retentates to provide a washed deboned meat that is suitable for human consumption and has a combined protein content of at least about 50 weight percent of the deboned meat content.

23. The process in accordance with claim 22, wherein the protein content of the washed deboned meat is within about 2 weight percentage points of the protein content of the deboned meat.

24. The process in accordance with claim 22, wherein said slurry is maintained at a temperature between about 2° C. and about 5° C.

* * * * *

UNITED STATES PATENT AND TRADEMARK OFFICE
CERTIFICATE OF CORRECTION

| | | |
|---|---|---|
| PATENT NO. | : 7,569,245 B2 | Page 1 of 1 |
| APPLICATION NO. | : 10/855028 | |
| DATED | : August 4, 2009 | |
| INVENTOR(S) | : Kang et al. | |

It is certified that error appears in the above-identified patent and that said Letters Patent is hereby corrected as shown below:

On the Title page,

[*] Notice:   Subject to any disclaimer, the term of this patent is extended or adjusted under 35 U.S.C. 154(b) by 888 days.

Delete the phrase "by 888 days" and insert -- by 1383 days --

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,569,245 B2
APPLICATION NO. : 10/855028
DATED : August 4, 2009
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1878 days.

Signed and Sealed this

Seventh Day of September, 2010

David J. Kappos
*Director of the United States Patent and Trademark Office*